United States Patent
Mizugaki

(10) Patent No.: US 10,843,637 B2
(45) Date of Patent: Nov. 24, 2020

(54) VIBRATION DEVICE, ELECTRONIC APPARATUS AND VEHICLE

(71) Applicant: SEIKO EPSON CORPORATION, Tokyo (JP)

(72) Inventor: Koichi Mizugaki, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/728,083

(22) Filed: Dec. 27, 2019

(65) Prior Publication Data

US 2020/0207282 A1    Jul. 2, 2020

(30) Foreign Application Priority Data

Dec. 28, 2018 (JP) .................................. 2018-247480

(51) Int. Cl.
*B60R 11/02* (2006.01)
*G06F 1/16* (2006.01)
*G10K 9/122* (2006.01)

(52) U.S. Cl.
CPC ........ *B60R 11/0235* (2013.01); *G06F 1/1605* (2013.01); *G10K 9/122* (2013.01)

(58) Field of Classification Search
None
See application file for complete search history.

(56) References Cited

U.S. PATENT DOCUMENTS

| 6,147,564 | A | 11/2000 | Nakamiya et al. |
| 2003/0197184 | A1 | 10/2003 | Kaneko |
| 2006/0249807 | A1* | 11/2006 | Akiyama ............ H01L 29/7824 257/499 |
| 2011/0037050 | A1* | 2/2011 | Kim ........................ H01L 33/08 257/13 |
| 2011/0198642 | A1* | 8/2011 | Kim ...................... H01L 33/405 257/98 |
| 2013/0027623 | A1* | 1/2013 | Negishi ............ G02F 1/133603 349/42 |
| 2015/0287719 | A1 | 10/2015 | Furuhata |
| 2016/0181477 | A1* | 6/2016 | Lee ......................... H01L 33/42 257/98 |

(Continued)

FOREIGN PATENT DOCUMENTS

| JP | H10-160867 A | 6/1998 |
| JP | 2000-223996 A | 8/2000 |

(Continued)

*Primary Examiner* — Talha M Nawaz
(74) *Attorney, Agent, or Firm* — Oliff PLC

(57) ABSTRACT

A vibration device includes: a base substrate which is a first conductivity type semiconductor substrate; a lid substrate; a vibration element disposed between the base substrate and the lid substrate; a wiring disposed on a surface of the base substrate at the lid substrate side; and a coupling member that electrically couples the wiring and the vibration element to each other. The base substrate includes a second conductivity type well, which is different from the first conductivity type, and a first conductivity type first contact area that is disposed in the well and that has a first contact surface which is a part of the surface. The wiring and the coupling member are in contact with the first contact surface, and are electrically coupled to each other via the first contact area.

10 Claims, 13 Drawing Sheets

(56) References Cited

U.S. PATENT DOCUMENTS

2017/0134004 A1    5/2017  Isozaki et al.

FOREIGN PATENT DOCUMENTS

| JP | 2006-060245 A | 3/2006 |
| JP | 2009-159548 A | 7/2009 |
| JP | 2012-151143 A | 8/2012 |
| JP | 2013-026761 A | 2/2013 |
| JP | 2015-201500 A | 11/2015 |
| JP | 2015-211399 A | 11/2015 |
| JP | 2017-092698 A | 5/2017 |
| JP | 2017-139717 A | 8/2017 |

\* cited by examiner

VIBRATION DEVICE, ELECTRONIC APPARATUS AND VEHICLE

The present application is based on, and claims priority from JP Application Serial Number 2018-247480, filed Dec. 28, 2018, the disclosure of which is hereby incorporated by reference herein in its entirety.

BACKGROUND

1. Technical Field

The present disclosure relates to a vibration device, an electronic apparatus and a vehicle.

2. Related Art

A crystal vibrator disclosed in JP-A-2000-223996 includes a base substrate, a lid substrate, and a vibration substrate sandwiched between the base substrate and the lid substrate. In addition, the vibration substrate includes a vibrator and a frame-shaped frame surrounding the vibrator. The base substrate and the frame are anodically joined, and the lid substrate and the frame are anodically joined.

However, in the crystal vibrator disclosed in JP-A-2000-223996, an electric signal of the vibration element is pulled out to the outside via a metal film used for anodic joining. For this reason, for example, there is a problem in that parasitic capacitance is likely to occur between the metal film and other wirings, which may adversely affect the characteristics of the vibration element.

SUMMARY

An aspect of the present disclosure is directed to a vibration device including: abase substrate which is a first conductivity type semiconductor substrate; a lid substrate; a vibration element disposed between the base substrate and the lid substrate; a wiring disposed on a surface of the base substrate at the lid substrate side; and a coupling member that electrically couples the wiring and the vibration element to each other. The base substrate includes a second conductivity type well, which is different from the first conductivity type, and a first conductivity type first contact area that is disposed in the well and that has a first contact surface located to a surface at the lid substrate side. The wiring and the coupling member are in contact with the first contact surface, and are electrically coupled to each other via the first contact area.

In the aspect of the present disclosure, the vibration device may further include an oscillator circuit formed on the base substrate and including the wiring.

Another aspect of the present disclosure is directed to an electronic apparatus including the vibration device according to the aspect of the present disclosure, and an arithmetic processor that operates based on an oscillation signal output from the oscillator circuit of the vibration device.

Still another aspect of the present disclosure is directed to a vehicle including the vibration device according to the aspect of the present disclosure, and an arithmetic processor that operates based on an oscillation signal output from the oscillator circuit of the vibration device.

DESCRIPTION OF EXEMPLARY EMBODIMENTS

Hereinafter, a vibration device, an electronic apparatus and a vehicle according to an aspect of the present disclosure will be described in detail based on embodiments illustrated in the accompanying drawings.

First Embodiment

Figure 1:
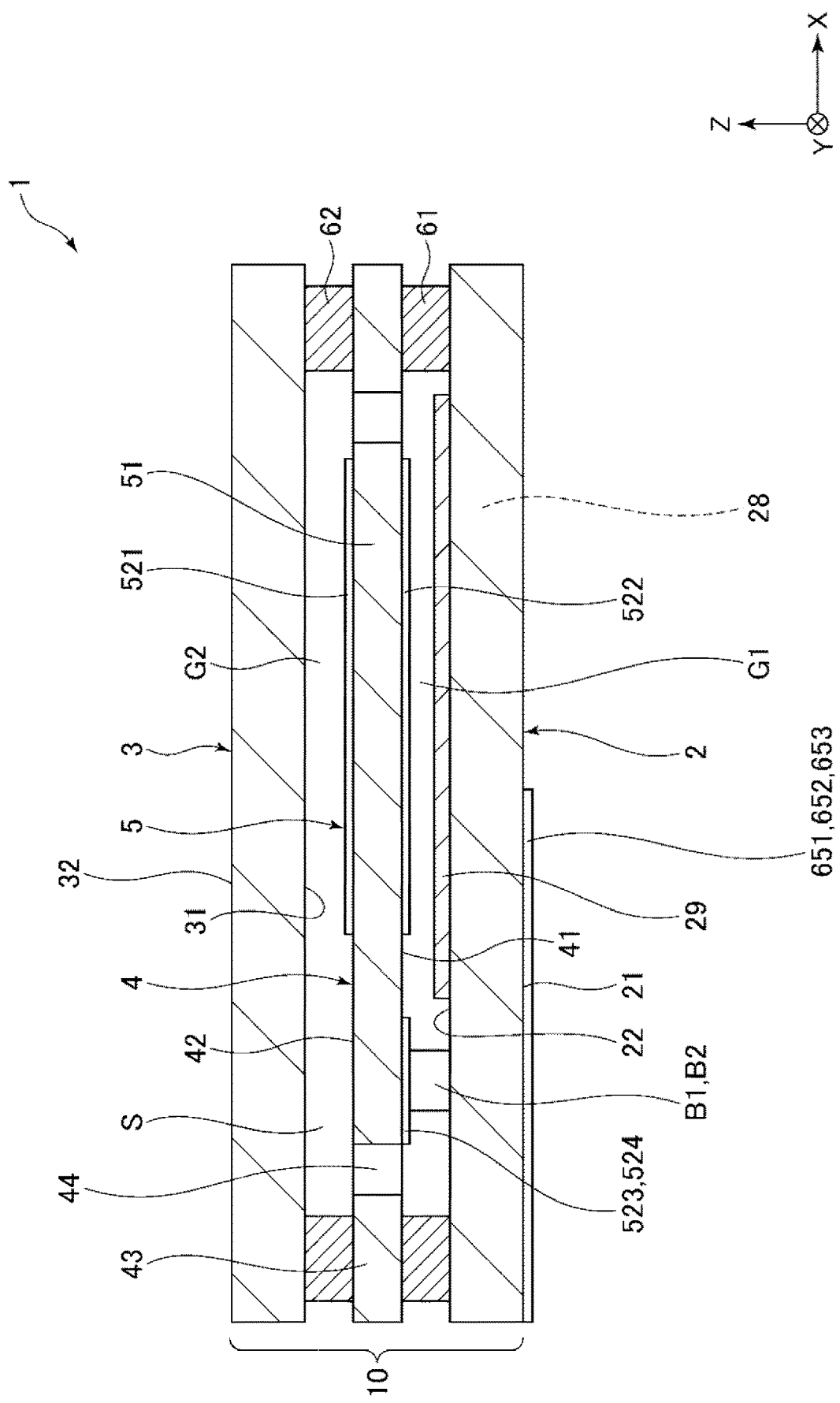
FIG. 1 is a cross-sectional view illustrating a vibration device in a first embodiment.
Figure 2:
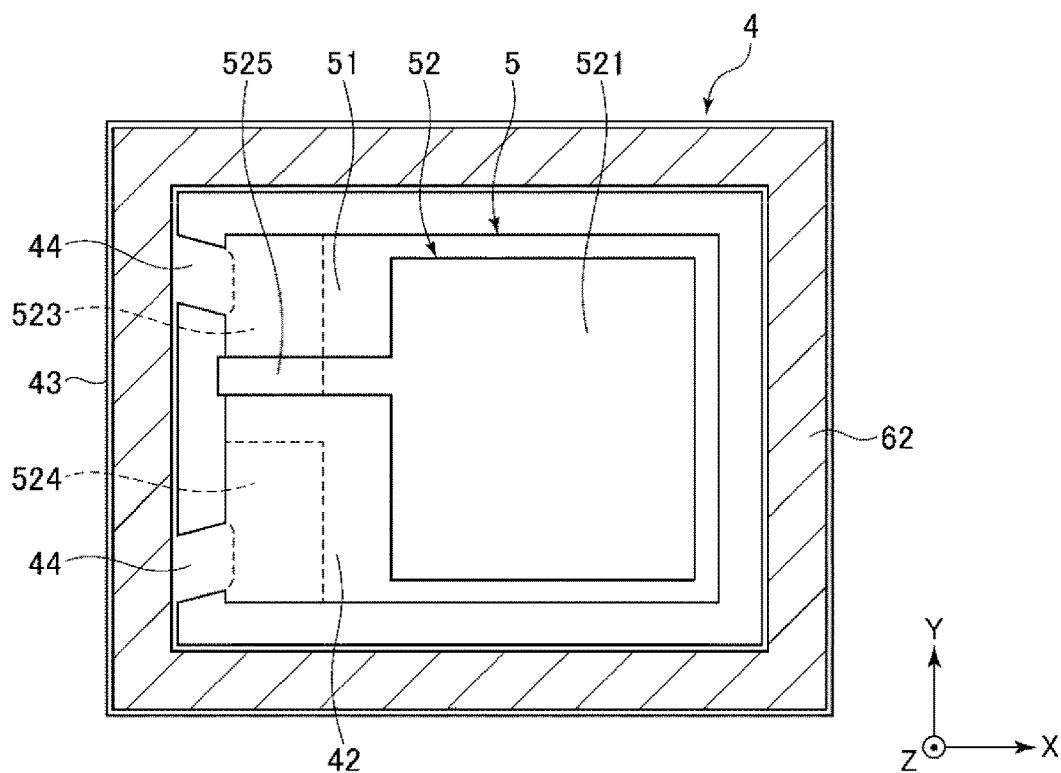
FIG. 2 is a top view of an intermediate substrate.
Figure 3:
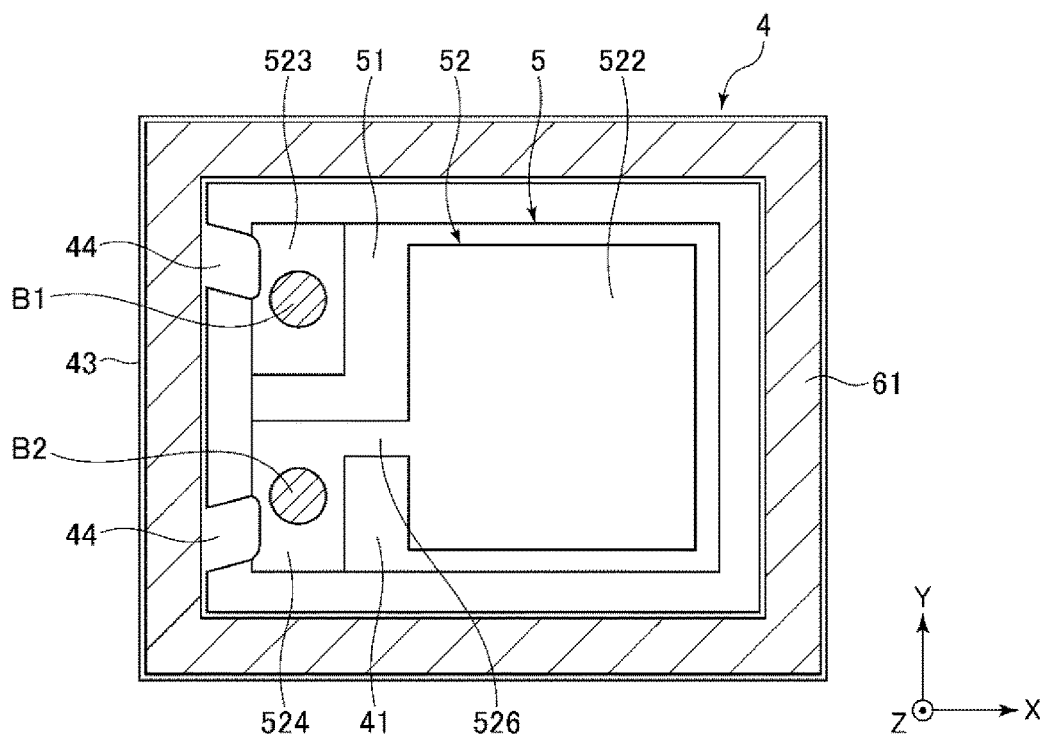
FIG. 3 is a transmission diagram of a lower surface of the intermediate substrate viewed from the upper surface side.
Figure 4:
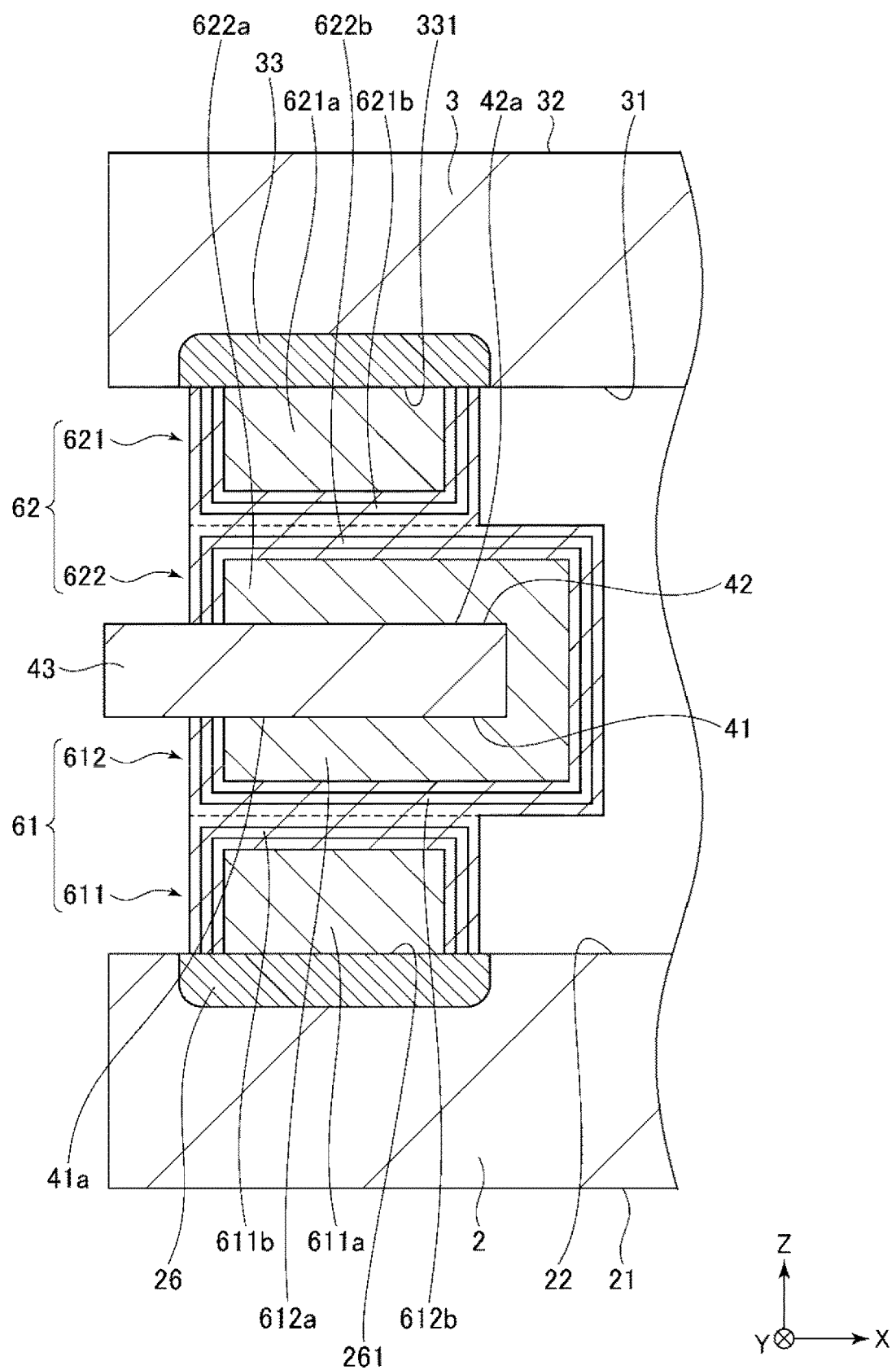
FIG. 4 is a cross-sectional view illustrating first and second joining members.
Figure 5:
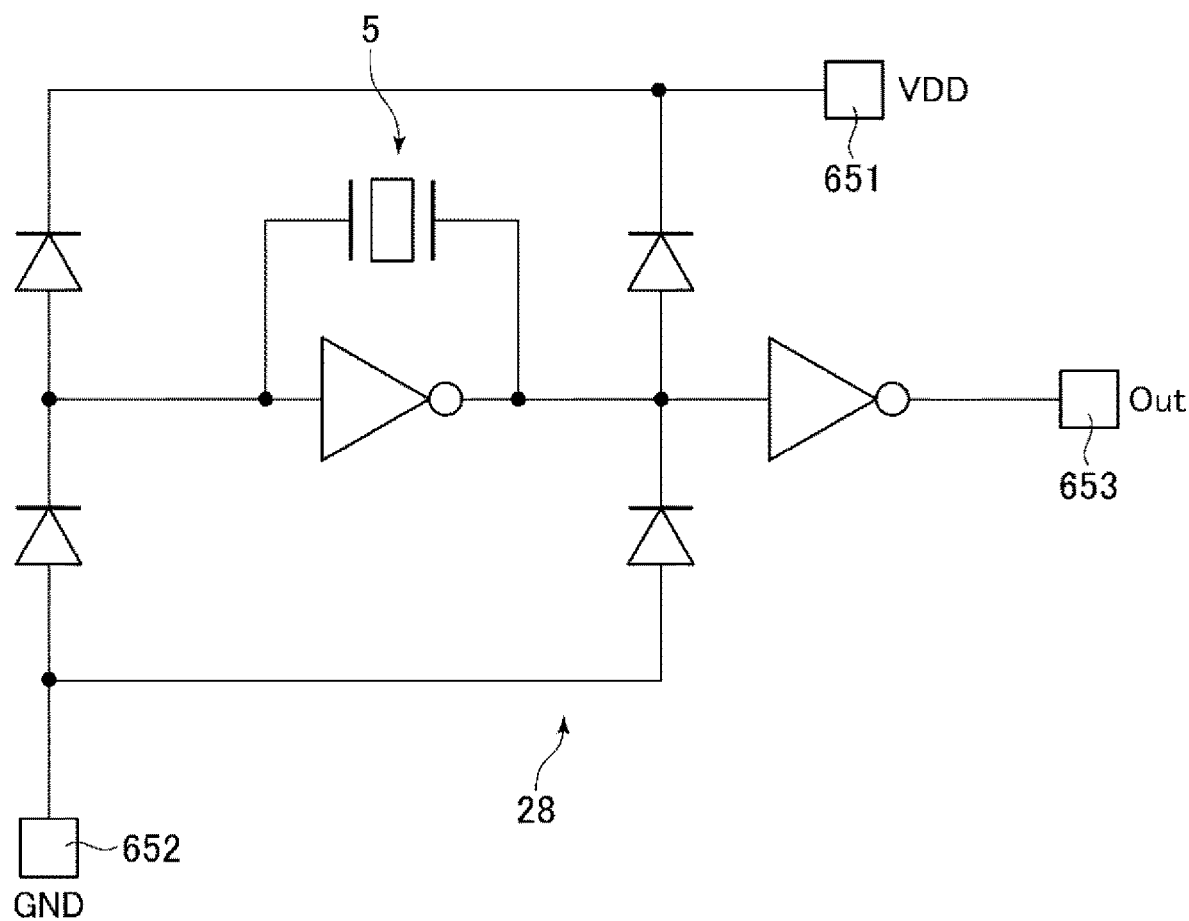
FIG. 5 is a circuit diagram illustrating a circuit formed on a base substrate.
Figure 6:
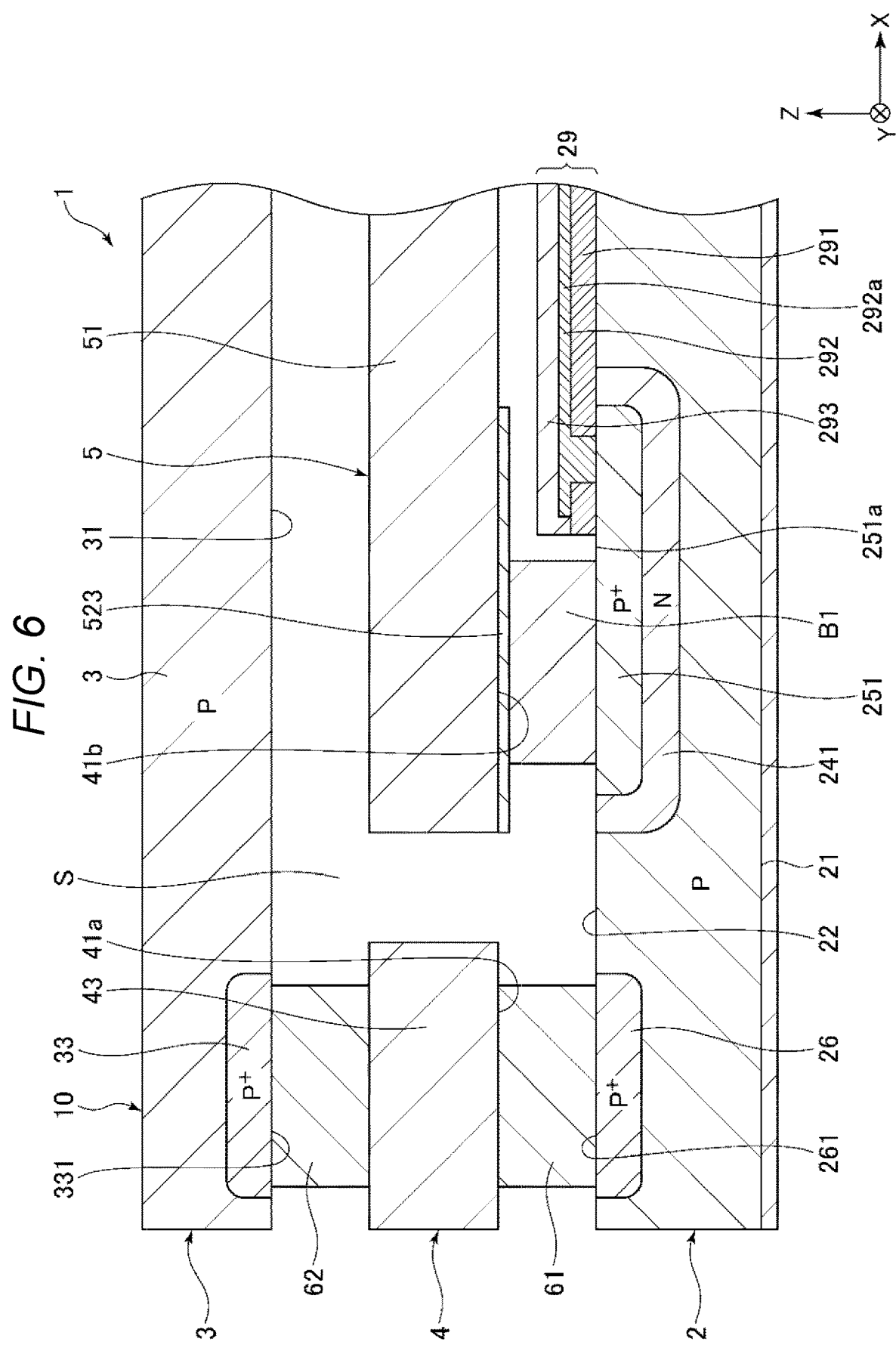
FIG. 6 is a cross-sectional view illustrating a detailed configuration of the base substrate.
Figure 7:
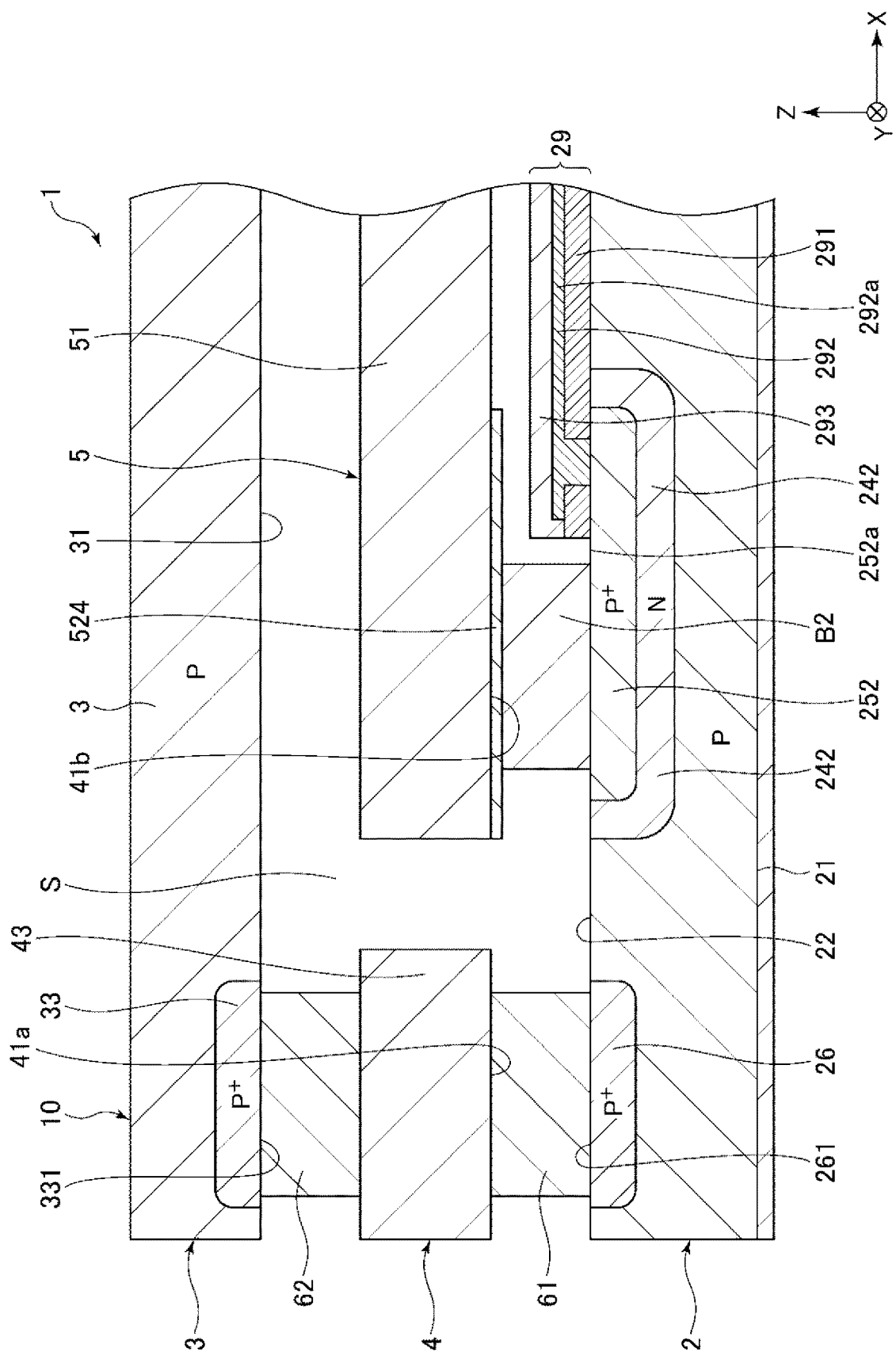
FIG. 7 is a cross-sectional view illustrating a detailed configuration of the base substrate.
Figure 8:
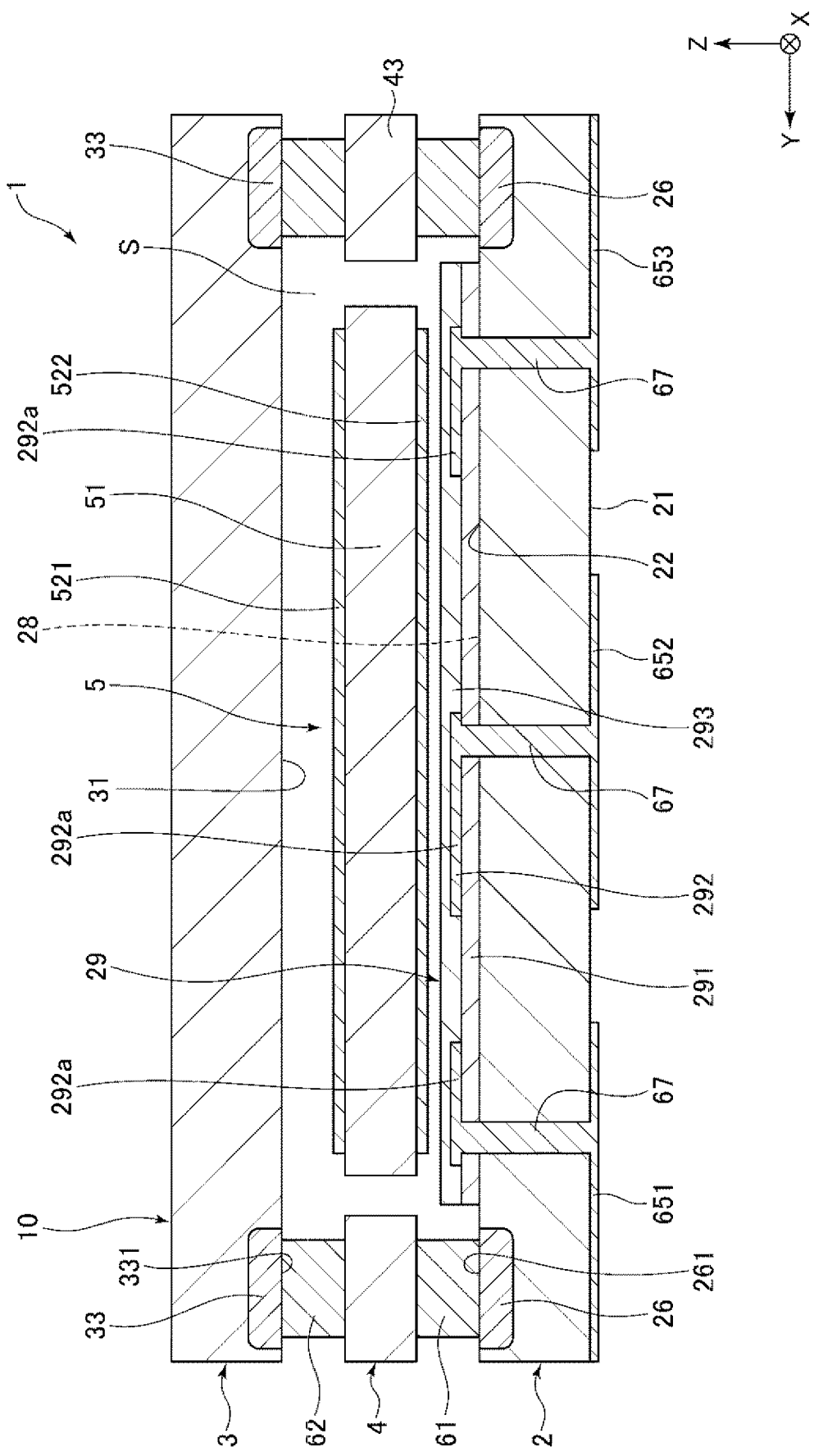
FIG. 8 is a cross-sectional view illustrating a detailed configuration of the base substrate.

FIG. 1 is a cross-sectional view illustrating a vibration device in a first embodiment. FIG. 2 is a top view of an intermediate substrate. FIG. 3 is a transmission diagram of a lower surface of the intermediate substrate viewed from the upper surface side. FIG. 4 is a cross-sectional view illustrating first and second joining members. FIG. 5 is a circuit diagram illustrating a circuit formed on a base substrate. FIG. 6 to FIG. 8 are cross-sectional views illustrating a detailed configuration of the base substrate respectively. For the convenience of explanation, three axes orthogonal to each other are illustrated in each figure, as an X axis, a Y axis, and a Z axis. In addition, in FIG. 1, a positive side of the Z axis is also referred to as "upper", and a negative side of the Z axis is also referred to as "lower".

A vibration device 1 illustrated in FIG. 1 includes a base substrate 2, a lid substrate 3, and an intermediate substrate 4, and has a structure in which the intermediate substrate 4 is sandwiched between the base substrate 2 and the lid substrate 3. The base substrate 2 has a plate shape including a lower surface 21 which is a first surface and an upper surface 22 opposite to the lower surface 21, which is a second surface. The lid substrate 3 is located above the base substrate 2, and has a plate shape including a lower surface 31 which is a third surface located on the base substrate 2 side and an upper surface 32 opposite to the lower surface 31, which is a fourth surface. The intermediate substrate 4 is located between the base substrate 2 and the lid substrate 3, and has a plate shape including a lower surface 41 which is a fifth surface located on the base substrate 2 side and an upper surface 42 which is a sixth surface at the lid substrate 3 side. Of these three substrates, each of the base substrate 2 and the lid substrate 3 is a silicon substrate, and the intermediate substrate 4 is a crystal substrate.

In addition, as illustrated in FIG. 2 and FIG. 3, the intermediate substrate 4 includes a vibration element 5, a frame-shaped frame 43 that surrounds the vibration element 5, and a coupler 44 that links the vibration element 5 and the frame 43. The vibration element 5 includes a vibration substrate 51 formed from the intermediate substrate 4 and an electrode 52 disposed on the surface of the vibration substrate 51. The vibration substrate 51 has a thickness-shear vibration mode and is formed of an AT cut crystal substrate in the present embodiment. That is, the intermediate substrate 4 uses the AT cut crystal substrate as the crystal substrate. Since the AT cut crystal substrate has third-order frequency temperature characteristics, the vibration element 5 has excellent temperature characteristics.

The electrode 52 includes an excitation electrode 521 disposed on the upper surface 42 of the vibration substrate 51, and an excitation electrode 522 disposed on the lower surface 41 so as to face the excitation electrode 521. In addition, the electrode 52 includes a pair of terminals 523 and 524 disposed on the lower surface 41 of the vibration substrate 51, a wiring 525 that electrically couples the terminal 523 and the excitation electrode 521, and a wiring 526 that electrically couples the terminal 524 and the excitation electrode 522.

The configuration of the vibration element 5 is not limited to the configuration described above. For example, the vibration element 5 may be a mesa type in which a vibration area sandwiched between the excitation electrodes 521 and 522 protrudes from the periphery thereof, or conversely, may be an inverted mesa type in which the vibration area is recessed from the periphery thereof. In addition, bevel processing for grinding the periphery of the vibration substrate 51 and convex processing for making the upper surface 42 and the lower surface projection-curved surfaces, may be performed on the vibration substrate 51.

In addition, the vibration element 5 is not limited to one that vibrates in the thickness-shear vibration mode, and for example, may be a vibration element in which a plurality of vibrating arms bend and vibrate in the in-surface direction. That is, the vibration substrate 51 is not limited to one that formed of the AT cut crystal substrate, but may be formed of a crystal substrate other than the AT cut crystal substrate, for example, an X cut crystal substrate, a Y cut crystal substrate, a Z cut crystal substrate, a BT cut crystal substrate, an SC cut crystal substrate, an ST cut crystal substrate or the like. In addition, in the present embodiment, the vibration substrate 51 is made of quartz, and is not limited thereto, but for example, may be made of a piezoelectric single crystal such as lithium niobate, lithium tantalate, lithium tetraborate, langalite, potassium niobate, gallium phosphate, or the like, and may be made of a piezoelectric single crystal other than those described above.

As illustrated in FIG. 1, the vibration device 1 includes: a first joining member 61 that is located between the frame 43 and the base substrate 2 and joins the lower surface 41 of the frame 43 and the upper surface 22 of the base substrate 2; and a second joining member 62 that is located between the frame 43 and the lid substrate 3 and that joins the upper surface 42 of the frame 43 and the lower surface 31 of the lid substrate 3. Then, a package 10 is configured by joining the base substrate 2, the lid substrate 3 and the frame 43 by the first joining member 61 and the second joining member 62, and a storage space S for accommodating the vibration element 5 is formed inside the package 10. The storage space S is hermetically sealed and is in a reduced pressure state, preferably closer to a vacuum state. In this way, viscous resistance is decreased and the vibration element 5 can be driven stably. However, the atmosphere of the storage space S is not particularly limited to the description above, but for example, the atmosphere may be in an atmospheric pressure state or a pressurized state.

The first joining member 61 not only functions as a joining member that joins the frame 43 and the base substrate 2 but also functions as a gap member that forms a gap G1 between the vibration element 5 and the base substrate 2. Similarly, the second joining member 62 not only functions as a joining member that joins the frame 43 and the lid substrate 3 but also functions as a gap member that forms a gap G2 between the vibration element 5 and the lid substrate 3. As described above, the first joining member 61 and the second joining member 62 also serve as the gap members, and thus, the configuration of the package 10 becomes simple.

In addition, the first joining member 61 and the second joining member 62 have conductivity, and are made of metal in the present embodiment. Specifically, as illustrated in FIG. 4, the first joining member 61 includes a metal film 611 provided on the upper surface 22 of the base substrate 2 and a metal film 612 provided on the lower surface 41 of the frame 43, and is formed by performing diffusion joining on the upper surface of the metal film 611 and the lower surface of the metal film 612. The metal film 611 is configured by forming a plated layer 611b which is a laminate of Ni (nickel), Pd (palladium), and Au (gold) on a base 611a made of Cu (copper), and similarly, the metal film 612 is configured by forming a plated layer 612b which is a laminate of Ni, Pd, and Au on a base 612a made of Cu. The gold plated layers on the surfaces of the metal films 611 and 612 are diffusion joined. According to the configuration described above, since the surface of the first joining member 61 is covered with a gold plated film, a weather resistance can become excellent, and thus, it is possible to effectively suppress corrosion of the first joining member 61.

As similarly, the second joining member 62 is formed by performing the diffusion joining on the metal film 621 provided on the lower surface 31 of the lid substrate 3 and the metal film 622 provided on the upper surface 42 of the frame 43. The metal film 621 is configured by forming a plated layer 621b which is a laminate of Ni, Pd, and Au on a base 621a made of Cu, and similarly, the metal film 622 is also configured by forming a plated layer 622b which is a Ni/Pd/Au laminate on a base 622a made of Cu. Then, the gold plated films on each of the surfaces are diffusion joined.

In addition, the first joining member 61 and the second joining member 62 are in contact with each other around the inner side surface of the frame 43 and are electrically coupled to each other. Therefore, the base substrate 2 and the lid substrate 3 are electrically coupled via the first joining member 61 and the second joining member 62.

The base substrate 2 is a silicon substrate, and in particular, in the present embodiment, a P-type silicon substrate having P-type conductivity which is the first conductivity type is used. The P-type silicon substrate is manufactured, for example, by doping a silicon substrate with a P-type impurity such as boron (B) or aluminum (Al). However, the base substrate 2 and the lid substrate 3 are not particularly limited, but an N-type silicon substrate may be used, or a semiconductor substrate other than the silicon, for example, a compound semiconductor substrate such as Ge, GaP, GaAs, or InP may be used.

In addition, the circuit 28 electrically coupled to the vibration element 5 is formed on the base substrate 2, and in the present embodiment, the upper surface 22 is an active surface. As described above, the space of the base substrate 2 can be effectively used by forming the circuit 28 on the base substrate 2. The circuit 28 is not particularly limited, but an oscillator circuit that generates a frequency of a reference signal such as a clock signal by oscillating the vibration element 5 as illustrated in FIG. 5 can be included as an example thereof. Such an oscillator circuit includes, for example, an electrostatic protection circuit that suppresses a breakdown due to static electricity. By including the electrostatic protection circuit in the circuit 28, it is possible to suppress a damage to the circuit 28 due to electrostatic discharge (ESD).

In addition, as illustrated in FIG. 6 and FIG. 7, a laminate 29 in which a first insulation layer 291, a first wiring layer 292 and a second insulation layer 293 are laminated is provided on the upper surface 22 of the base substrate 2, and a plurality of circuit elements (not illustrated) formed on the upper surface 22 are electrically coupled via a wiring 292a included in the first wiring layer 292 to configure the circuit 28.

In addition, as illustrated in FIG. 8, three external coupling terminals 651, 652, and 653 are provided on the lower surface 21 of the base substrate 2. In addition, these three external coupling terminals 651, 652, and 653 are electrically coupled to the circuit 28 via a through-electrode 67 that extends through the lower surface 21 and the upper surface 22 of the base substrate 2, respectively. Of the external coupling terminals 651, 652, and 653, the external coupling terminal 651 is a terminal coupled to the power supply, the external coupling terminal 652 is a terminal coupled to a ground, and the external coupling terminal 653 is a terminal to which the oscillation signal from the circuit 28 is output. In addition, the number of external coupling terminals is not limited to three, and may be adjusted according to the configuration of the circuit 28.

In addition, as illustrated in FIG. 6 and FIG. 7, the base substrate 2 has N-type wells 241 and 242 which are second conductivity types different from the P-type ones. As illustrated in FIG. 6, a first contact area 251 on which the P-type impurity including the first contact surface 251a which is apart of the upper surface 22 is doped at a high concentration is formed in the well 241, and as illustrated in FIG. 7, the P-type first contact area 252 including a first contact surface 252a which is a part of the upper surface 22 is formed in the well 242. The first contact surfaces 251a and 252a are in contact with the wiring 292a, respectively. Therefore, the base substrate 2 and the wiring 292a are in ohmic contact, and the resistance value therebetween can be further suppressed to be low. The first contact surfaces 251a and 252a are partially exposed from the laminate 29.

Furthermore, as illustrated in FIG. 6 and FIG. 7, the vibration device 1 includes bumps B1 and B2 which are a pair of first coupling members located between the base substrate 2 and the intermediate substrate 4. A lower end of the bump B1 is in contact with the first contact surface 251a and an upper end of the bump B1 is in contact with the terminal 523 of the vibration element 5, and thus, the first contact surface 251a and the vibration element 5 are electrically coupled to each other. Therefore, the base substrate 2 and the bump B1 are in ohmic contact, and the resistance value therebetween can be further suppressed to be low. Similarly, a lower end of the bump B2 is in contact with the first contact surface 252a and an upper end of the bump B2 is in contact with the terminal 524 of the vibration element 5, and thus, the first contact surface 252a and the vibration element 5 are electrically coupled to each other. Therefore, the base substrate 2 and the bump B2 are in ohmic contact, and the resistance value therebetween can be further suppressed to be low.

That is, the bump B1 is electrically coupled to the wiring 292a via the first contact area 251, and the bump B2 is electrically coupled to the wiring 292a via the first contact area 252. As a result, the excitation electrodes 521 and 522 of the vibration element 5 are electrically coupled to the circuit 28. As described above, by electrically coupling the vibration element 5 and the circuit 28 via the bumps B1 and B2, there is no need to use the first and second joining members 61 and 62 as a pull-out wiring as in the related art. Therefore, the parasitic capacitance is hardly formed between other wirings, and thus, it is possible to effectively suppress the deterioration of the characteristics of the vibration element 5.

The bumps B1 and B2 are not particularly limited as long as they have conductivity and joining properties, however, it is desirable that the bumps B1 and B2 are formed of the same material as the first joining member 61 at the same time of forming the metal film 611 of the first joining member 61. In this way, it is not necessary to perform the process of forming the bumps B1 and B2 separately from the process of forming the first joining member 61. In addition, it is possible to easily form the bumps B1 and B2 having a thickness same as that of the first joining member 61.

In the present embodiment, in plan view of the base substrate 2, the bumps B1 and B2 are disposed at a position overlapping the vibration element 5, but not limited thereto, and for example, the bumps B1 and B2 may be disposed at a position overlapping the coupler 44. In this case, the terminals 523 and 524 of the vibration element 5 are respectively pulled out to the coupler 44, which may be sufficient as long as the terminals 523 and 524 are respectively coupled to the bumps B1 and B2 at the coupler 44.

In addition, as illustrated in FIG. 6 to FIG. 8, the base substrate 2 includes a second contact area 26 that is a high-concentration dope area in which P-type impurities are doped at a high concentration on other portions of the base substrate. In addition, the second contact area 26 includes a second contact surface 261 that is a part of the upper surface 22 of the base substrate 2, and the second contact surface 261 is exposed from the laminate 29. In other words, the laminate 29 is not formed on the second contact surface 261. In addition, the second contact surface 261 has a frame shape overlapping the frame 43 in plan view from the thickness direction of the base substrate 2. The base substrate 2 is in contact with the first joining member 61 at the second contact surface 261. Therefore, the base substrate 2 and the first joining member 61 are in ohmic contact, and the resistance value therebetween can be further suppressed to be low. In the present embodiment, the entire contact surface of the base substrate 2 with the first joining member 61 is configured with the second contact surface 261, but not limited thereto, and it may be sufficient that at least a part of the contact surface with the first joining member 61 of the base substrate 2 is configured with the second contact surface 261.

Similarly, as illustrated in FIG. 6 to FIG. 8, the lid substrate 3 includes a third contact area 33 which is a high-concentration dope area in which P-type impurities are doped at a high concentration on other portions of the lid substrate. In addition, the third contact area 33 includes a third contact surface 331 that is a part of the lower surface 31 of the lid substrate 3. The third contact surface 331 has a frame shape overlapping the frame 43 in plan view from the thickness direction of the lid substrate 3. The lid substrate 3 is in contact with the second joining member 62 at the third contact surface 331. Therefore, the lid substrate 3 and the second joining member 62 are in ohmic contact, and the resistance value therebetween can be further suppressed to be low. In the present embodiment, the entire contact surface of the lid substrate 3 with the second joining member 62 is configured with the third contact surface 331, but not limited thereto, and it may be sufficient that at least a part of the contact surface with the second joining member 62 of the lid substrate 3 is configured with the third contact surface 331.

In the present embodiment, since the base substrate 2 is a P-type silicon substrate and is coupled to the external coupling terminal 652 and has ground potential, the lid substrate 3 that is electrically coupled to the base substrate 2 via the first joining member 61 and the second joining member 62 also has ground potential. In this way, the package 10 functions as a shield layer, and thus, the vibration element 5 can be protected from an external disturbance. In addition, the package 10 can block the emission of noise generated from inside of the vibration device 1, and thus, it is possible to reduce the influence on the electronic components in the periphery. The package 10 may have a constant potential other than the ground potential.

In the vibration device 1 described above, as illustrated in FIG. 4, the second contact surface 261 which is a coupling surface of the base substrate 2 coupled to the first joining member 61 and a coupling surface 41a of the frame 43 coupled to the first joining member 61 are respectively planar surfaces. In this way, it is easy to form the metal film 611 on the second contact surface 261 and to form the metal film 612 on the coupling surface 41a. The planar surface means, for example, that a surface roughness Ra is equal to or less than 200 (nm). However, not limited thereto, for example, at least one of the second contact surface 261 and the coupling surfaces 41a may not be a planar surface, but may be a surface having relatively large irregularities exceeding the above-described surface roughness Ra.

Similarly, the third contact surface 331 of the lid substrate 3 coupled to the second joining member 62 and the coupling surface 42a of the frame 43 coupled to the second joining member 62 are respectively planar surfaces. As a result, it is easy to form the metal film 621 on the third contact surface 331 and to form the metal film 622 on the coupling surface 42a. The planar surface means, for example, that a surface roughness Ra is equal to or less than 200 (nm). However, not limited thereto, for example, at least one of the third contact surface 331 and the coupling surface 42a may not be a planar surface, but may be a surface having relatively large irregularities exceeding the above-described surface roughness Ra.

In addition, as illustrated in FIG. 6 and FIG. 7, in the base substrate 2, the first contact surfaces 251a and 252a which are coupling surfaces to the bumps B1 and B2 and the second contact surface 261 which is a coupling surface to the first joining member 61 described above are flush with each other. That is, the first contact surfaces 251a and 252a and the second contact surface 261 are located on the same X-Y plane. In addition, in the intermediate substrate 4, the coupling surface 41b coupled to the bumps B1 and B2 and the coupling surface 41a coupled to the first joining member 61 described above are flush with each other. That is, the coupling surfaces 41a and 41b are located on the same X-Y plane. With the configuration described above, for example, by making thicknesses of the bumps B1 and B2 to be the same as the thickness of the first joining member 61, it is possible to join the base substrate 2 and the intermediate substrate 4 to each other via the first joining member 61, and to easily and reliably perform the electrical coupling between the first contact surfaces 251a, 252a and the vibration element 5 via the bumps B1 and B2. Therefore, the thicknesses of bumps B1 and B2 can be easily controlled.

The "flush surface" means that, as described above, the two surfaces are located on the same X-Y plane, and also includes a case, for example, where the two surfaces are slightly displaced which may be caused by errors during the manufacturing. However, the present embodiment is not limited to this, and the first contact surfaces 251a and 252a and the second contact surface 261 may not be the flush surface, and the coupling surfaces 41a and 41b may not be the flush surface.

The vibration device 1 has been described above. As described above, the vibration device 1 includes the base substrate 2 that is a P-type semiconductor substrate which is a first conductivity type, the lid substrate 3, the vibration element 5 disposed between the base substrate 2 and the lid substrate 3, the wiring 292a disposed on the upper surface 22 which is a surface of the base substrate 2 at the lid substrate 3 side, and the bumps B1 and B2 as coupling members for electrically coupling the wiring 292a and the vibration element 5. In addition, the base substrate 2 includes the N-type wells 241 and 242 which are the second conductivity types different from the P-type, and P-type first contact areas 251 and 252 that are provided on the wells 241 and 242 and that include the first contact surfaces 251a and 252a located on the upper surface 22. The wiring 292a and the bumps B1 and B2 are in contact with the first contact surfaces 251a and 252a respectively, and are electrically coupled to each other via the first contact areas 251 and 252.

According to the vibration device 1 configured as described above, the wiring is pulled out from the intermediate substrate 4 via the bumps B1 and B2. Therefore, since the first joining member 61 and the second joining member 62 do not need to be used as the pull-out wiring, the parasitic capacitance is hardly formed between other wirings, and thus, it is possible to effectively suppress the deterioration of the characteristics of the vibration element 5. In the present embodiment, the first conductivity type is P type and the second conductivity type is N type, but not limited thereto, and the first conductivity type may be N type and the second conductivity type may be P type.

In addition, as described above, the vibration device 1 includes: the intermediate substrate 4 that is disposed between the base substrate 2 and the lid substrate 3 and that includes the vibration element 5, the frame 43 that forms a frame-shape surrounding the vibration element 5, and the coupler 44 that links the vibration element 5 and the frame 43; the conductive first joining member 61 located between the frame 43 and the base substrate 2 and joining the frame 43 and the base substrate 2; and the conductive second joining member 62 located between the frame 43 and the lid substrate 3 and joining the frame 43 and the lid substrate 3. According to the above configuration, the base substrate 2, the lid substrate 3, and the frame 43 form the package 10 that accommodates the vibration element 5. Therefore, the vibration element 5 can be protected.

In addition, as described above, the lid substrate 3 is a P-type semiconductor substrate. In addition, the first joining member 61 and the second joining member 62 are electrically coupled to each other. The base substrate 2 and the lid substrate 3 are electrically coupled to each other via the first joining member 61 and the second joining member 62. In this way, for example, by making the base substrate 2 be the ground potential (constant potential), the package 10 can function as a shield layer, and thus, the vibration element 5 can be protected from the external disturbance.

In addition, as described above, the base substrate 2 includes the P-type second contact area 26 having the second contact surface 261 doped with P-type impurities at a high concentration relative to the surroundings and located on the upper surface 22. Then, the first joining member 61 is in contact with the second contact surface 261. According to the above-described configuration, the base substrate 2 and the first joining member 61 are in ohmic contact, and the resistance value therebetween can be suppressed to be low.

In addition, as described above, the lid substrate 3 includes the P-type third contact area 33 having the third contact surface 331 doped with P-type impurities at a high concentration relative to the surroundings and located on the lower surface 31. Then, the second joining member 62 is in contact with the third contact surface 331. According to the above-described configuration, the lid substrate 3 and the second joining member 62 are in ohmic contact, and the resistance value therebetween can be suppressed to be low.

In addition, as described above, in the base substrate 2, the first contact surfaces 251a and 252a that are the coupling surfaces coupled to the bumps B1 and B2 and the second contact surface 261 that is a coupling surface coupled to the first joining member 61, are flush with each other. In addition, in the intermediate substrate 4, the coupling surface 41a coupled to the bumps B1 and B2 and the coupling surface 41b coupled to the first joining member 61, are flush with each other. Therefore, it is possible to join the base substrate 2 and the intermediate substrate 4 to each other via the first joining member 61, and to easily and reliably perform the electrical coupling between the first contact surfaces 251a and 252a and the vibration element 5 via the bumps B1 and B2.

In addition, as described above, the vibration device 1 includes the circuit 28 as an oscillator circuit including a wiring 292a, which is formed on the base substrate 2. In this way, by forming the circuit 28 on the base substrate 2, the base substrate 2 can be used effectively.

Second Embodiment

Figure 9:
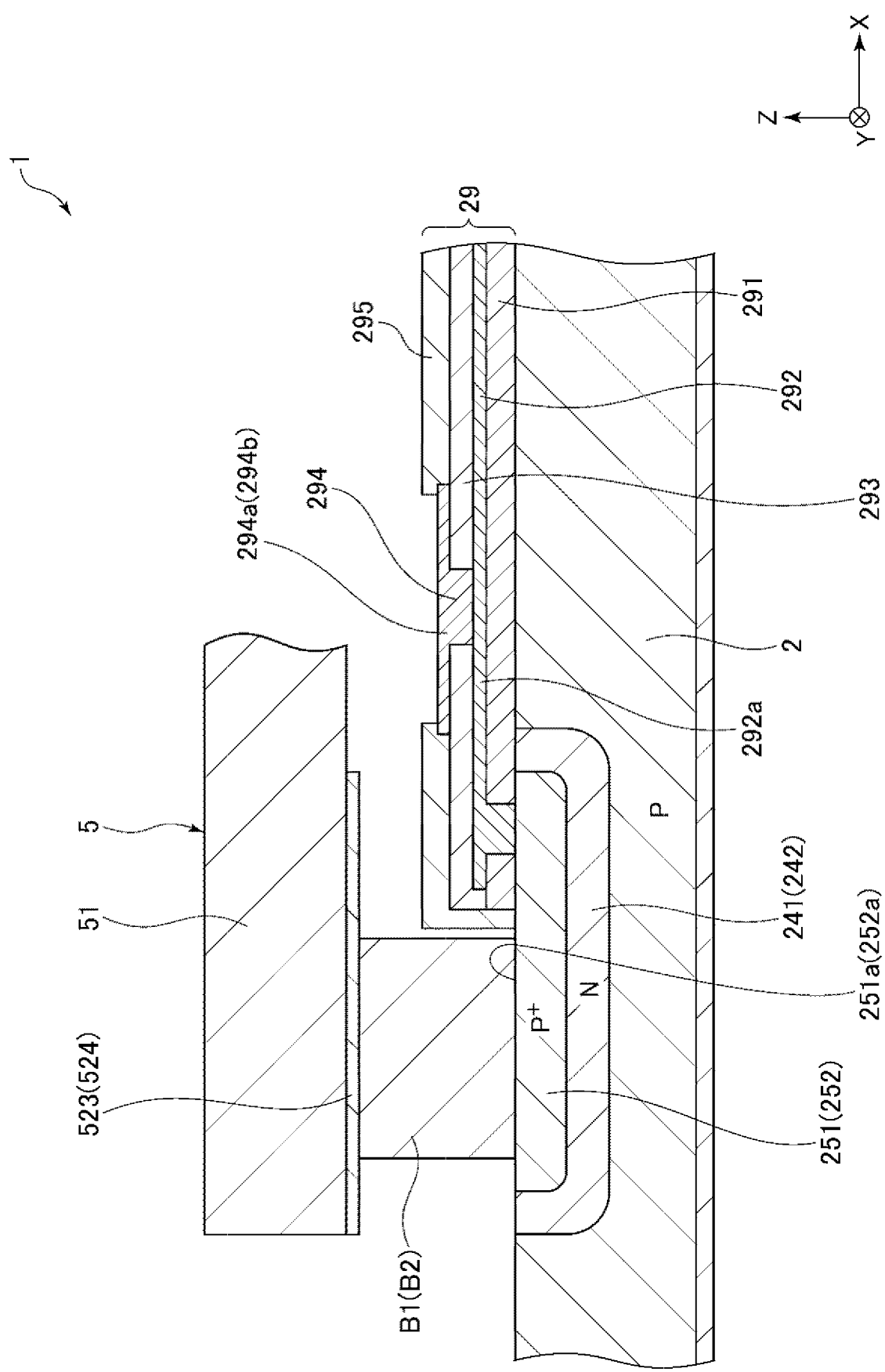
FIG. 9 is a cross-sectional view illustrating a vibration device in a second embodiment of the present disclosure.
Figure 10:
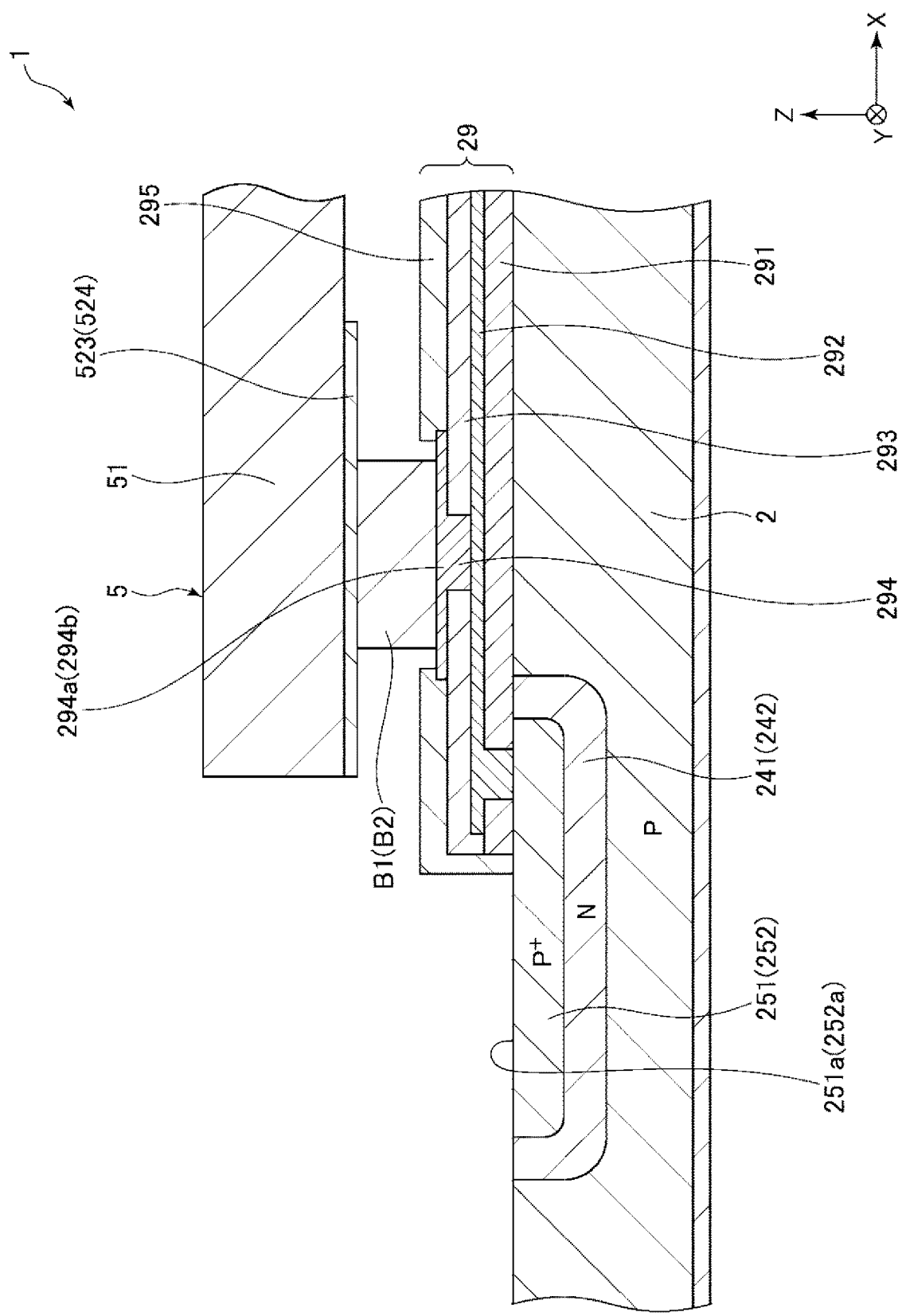
FIG. 10 is a cross-sectional view illustrating a modification example of the configuration illustrated in FIG. 9.

FIG. 9 is a cross-sectional view illustrating a vibration device in a second embodiment. FIG. 10 is a cross-sectional view illustrating a modification example of the configuration illustrated in FIG. 9.

A vibration device 1 in the present embodiment is mainly the same as the vibration device 1 in the first embodiment described above except that the configuration of the laminate 29 is different. In the descriptions below, the vibration device 1 in the second embodiment will be described focusing on the differences from that in the first embodiment described above, and the description of the same items will not be repeated. In addition, in FIG. 9 and FIG. 10, the same reference symbols will be given to the same configurations in the embodiment described above.

As illustrated in FIG. 9, in the vibration device 1 in the present embodiment, the laminate 29 has a configuration in which a first insulation layer 291, a first wiring layer 292, a second insulation layer 293, a second wiring layer 294, and a protection layer 295 are laminated. The second wiring layer 294 includes internal coupling terminals 294a and 294b, and the internal coupling terminals 294a and 294b are electrically coupled to the first wiring layer 292, respectively. The protection layer 295 is an insulating passivation film that protects the laminate 29 from moisture or the like, and the internal coupling terminals 294a and 294b are exposed from the protection layer 295.

In the configuration described above, for example, it is possible to select whether to dispose the bumps B1 and B2 while being in contact with the first contact surfaces 251a and 252a as illustrated in FIG. 9, or to dispose the bumps B1 and B2 while being in contact with the internal coupling terminals 294a and 294b as illustrated in FIG. 10, according to the shape and size of the vibration element 5. Therefore, the base substrate 2 having excellent versatility and high convenience can be obtained.

According to the second embodiment also, it is possible to exhibit the same effect as the first embodiment described above.

Third Embodiment

Figure 11:
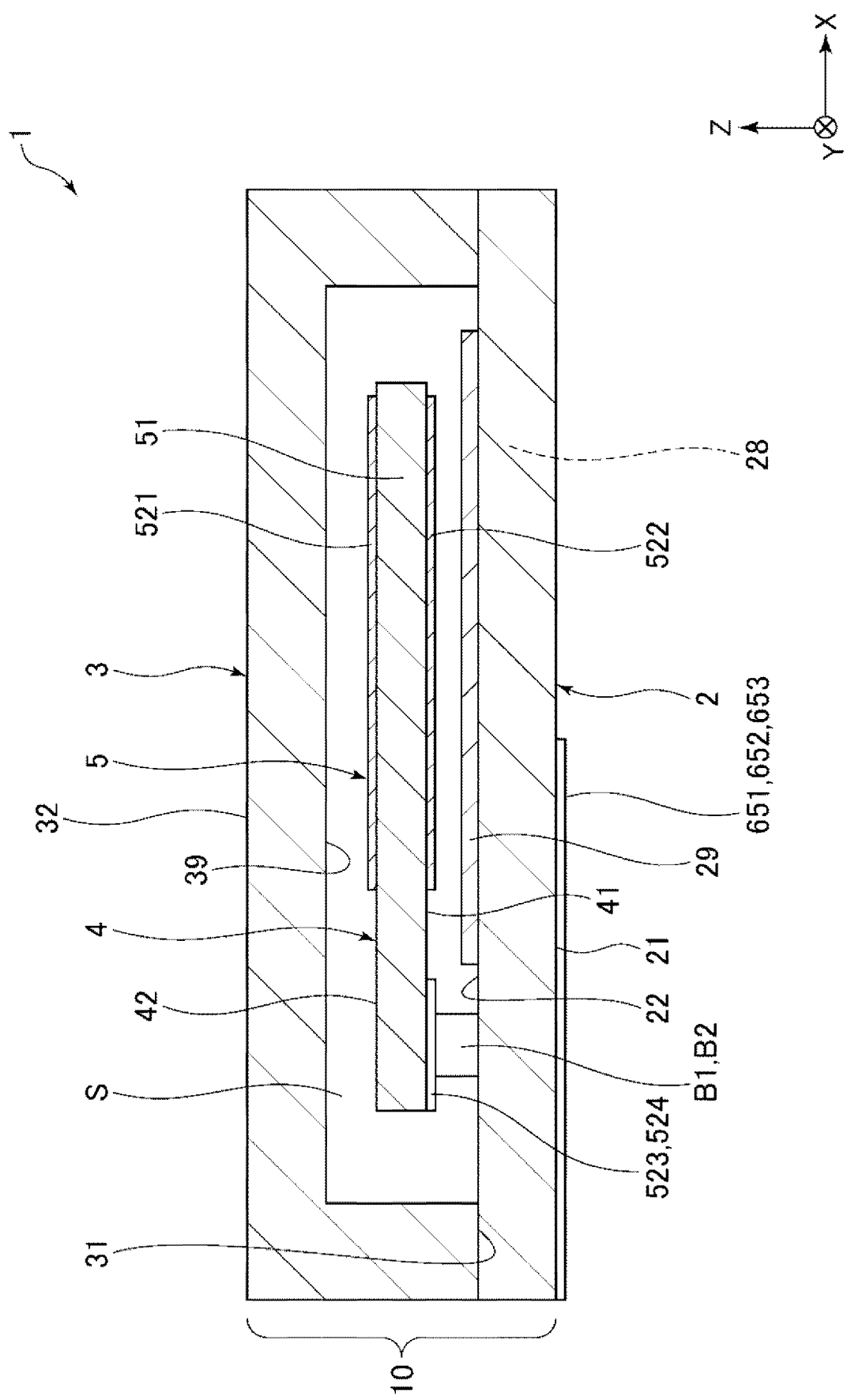
FIG. 11 is a cross-sectional view illustrating a vibration device in a third embodiment.

FIG. 11 is a cross-sectional view illustrating a vibration device in a third embodiment.

A vibration device 1 in the present embodiment is mainly the same as the vibration device 1 in the first embodiment described above except that the intermediate substrate 4 is omitted and the lid substrate 3 and the base substrate 2 are joined directly. In the descriptions below, the vibration device 1 in the third embodiment will be described focusing on the differences from that in the first embodiment described above, and the description of the same items will not be repeated. In addition, in FIG. 11, the same reference symbols will be given to the same configurations in the embodiment described above.

In the present embodiment, the vibration device 1 does not include the intermediate substrate 4. Therefore, as illustrated in FIG. 11, the vibration device 1 includes the base substrate 2, the vibration element 5, and the lid substrate 3. In addition, the lid substrate 3 includes a recess 39 that opens to the lower surface 31, and the vibration element 5 is accommodated in the recess 39. In addition, the lower surface 31 of the lid substrate 3 is directly joined to the upper surface 22 of the base substrate 2 by a surface activated joining method. That is, in the present embodiment, the base substrate 2 and the lid substrate 3 form a package 10 that accommodates the vibration element 5. According to such a configuration, for example, since the number of components can be reduced compared to the first embodiment described above, the vibration device 1 can be manufactured at a low cost and it becomes easier to manufacture. Furthermore, according to the surface activated joining method, the lid substrate 3 and the base substrate 2 can be joined at a room temperature, and the stress hardly remains in the package 10. In addition, since the base substrate 2 and the lid substrate 3 can be joined without using a joining member such as an adhesive or a metal film, it is possible to reduce the thickness of the package 10.

As described above, in the vibration device 1 in the present embodiment, the lid substrate 3 includes the recess 39 that opens to the lower surface 31 at the side of the base substrate 2 and that accommodates the vibration element 5, and is directly joined to the base substrate 2. In this way, the vibration device 1 can be manufactured at a low cost and it becomes easier to manufacture. In addition, according to the surface activated joining method, the lid substrate 3 and the base substrate 2 can be joined at a room temperature, and the stress hardly remains in the package 10. In addition, since the base substrate 2 and the lid substrate 3 can be joined without using a joining member such as an adhesive or a metal film, it is possible to reduce the thickness of the package 10.

According to the third embodiment also, it is possible to exhibit the same effect as the first embodiment described above.

Fourth Embodiment

Figure 12:
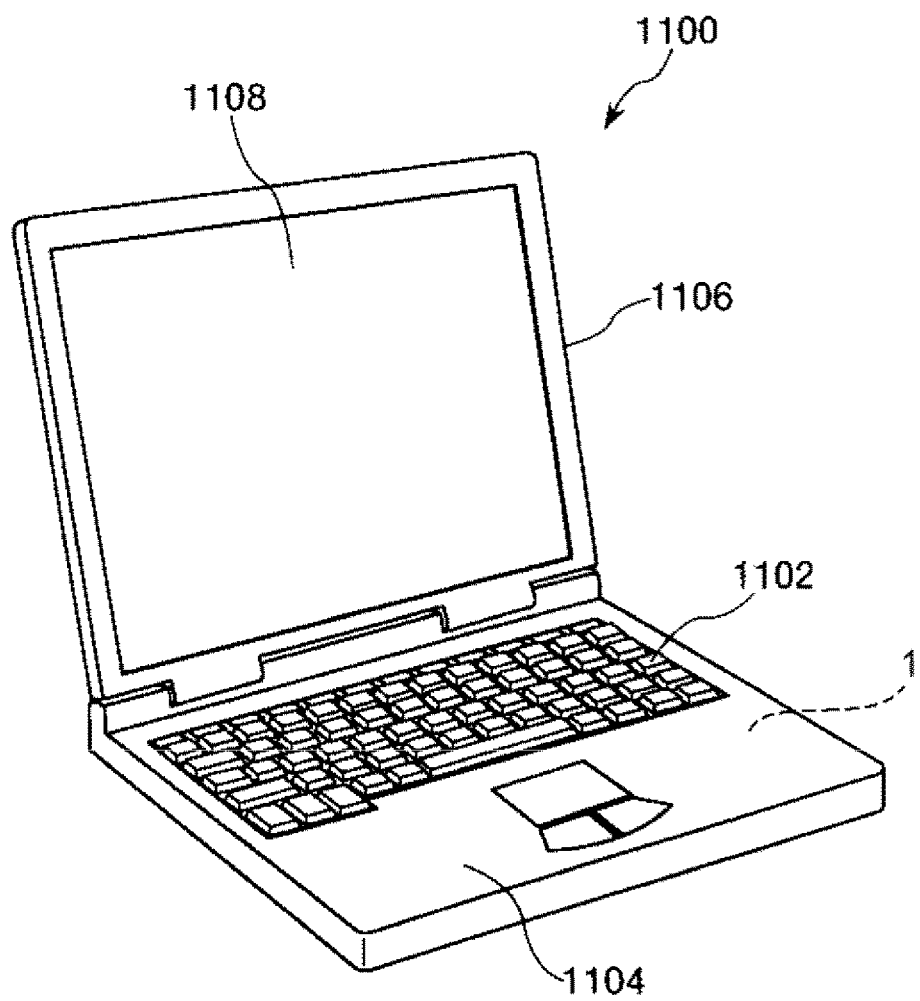
FIG. 12 is a perspective view illustrating an electronic apparatus in a fourth embodiment.

FIG. 12 is a perspective view illustrating an electronic apparatus according to the fourth embodiment.

A laptop type personal computer 1100 illustrated in FIG. 12 is an application of an electronic apparatus including the vibration device in the embodiments described above. In the figure, the personal computer 1100 is configured to include a main body 1104 having a keyboard 1102 and a display unit 1106 having a displayer 1108, and the display unit 1106 is rotatably supported by the main body 1104 via a hinge structure. The vibration device 1 used as an oscillator, for example is incorporated in such a personal computer 1100.

In addition, the personal computer 1100 includes an arithmetic processing circuit that performs arithmetic processing relating to a control of the keyboard 1102 and the displayer 1108. The arithmetic processing circuit operates based on an oscillation signal output from the oscillator circuit of the vibration device 1.

As described above, the personal computer 1100 as the electronic apparatus includes the vibration device 1 and the arithmetic processing circuit that operates based on the oscillation signal output from the oscillator circuit of the vibration device 1. Therefore, it is possible to exhibit a high reliability while enjoying the effects of the vibration device 1 described above.

Fifth Embodiment

Figure 13:
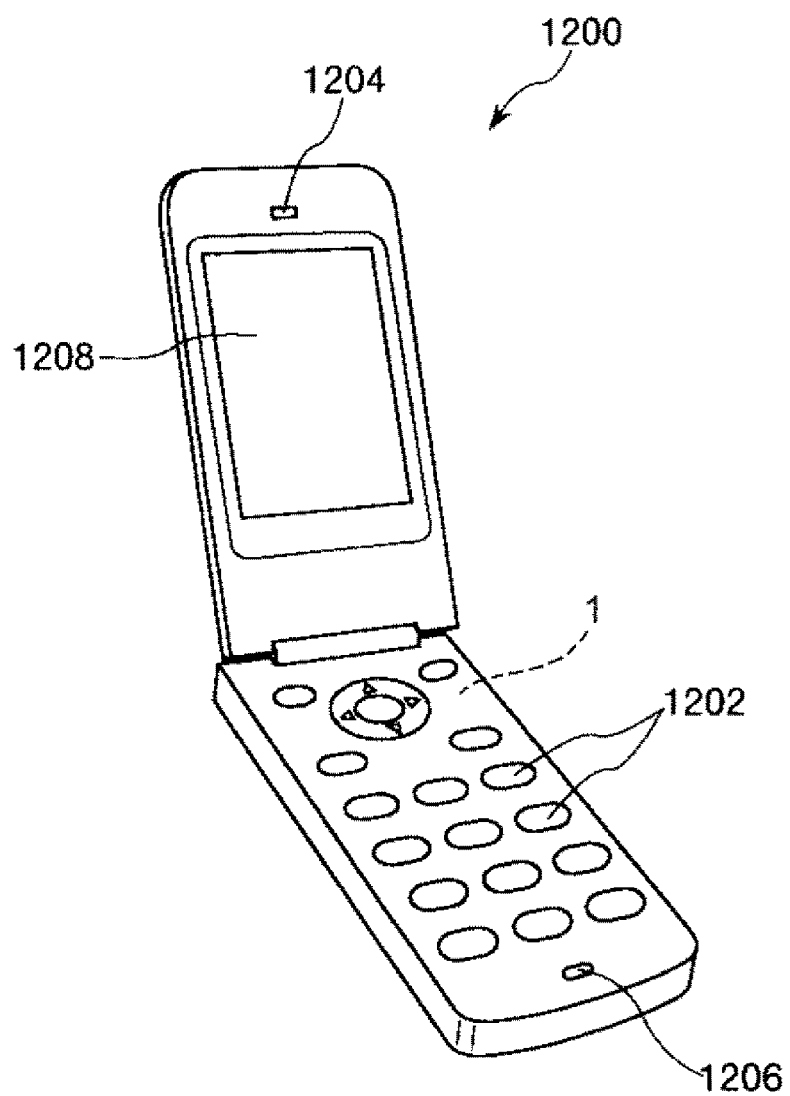
FIG. 13 is a perspective view illustrating an electronic apparatus in a fifth embodiment.

FIG. 13 is a perspective view illustrating an electronic apparatus in a fifth embodiment.

A mobile phone 1200 illustrated in FIG. 13 is an application of an electronic apparatus including the vibration device in the embodiments described above. The mobile phone 1200 includes an antenna, a plurality of operation buttons 1202, an earpiece 1204, and a mouthpiece 1206. The displayer 1208 is disposed between the operation buttons 1202 and the earpiece 1204. The vibration device 1 used as an oscillator, for example is incorporated in such a mobile phone 1200.

In addition, the mobile phone 1200 includes an arithmetic processing circuit that performs arithmetic processing relating to a control of the operation button 1202 and the like. The arithmetic processing circuit operates based on an oscillation signal output from the oscillator circuit of the vibration device 1.

As described above, the mobile phone 1200 as the electronic apparatus includes the vibration device 1 and the arithmetic processing circuit that operates based on the oscillation signal output from the oscillator circuit of the vibration device 1. Therefore, it is possible to exhibit a high reliability while enjoying the effects of the vibration device 1 described above.

Sixth Embodiment

Figure 14:
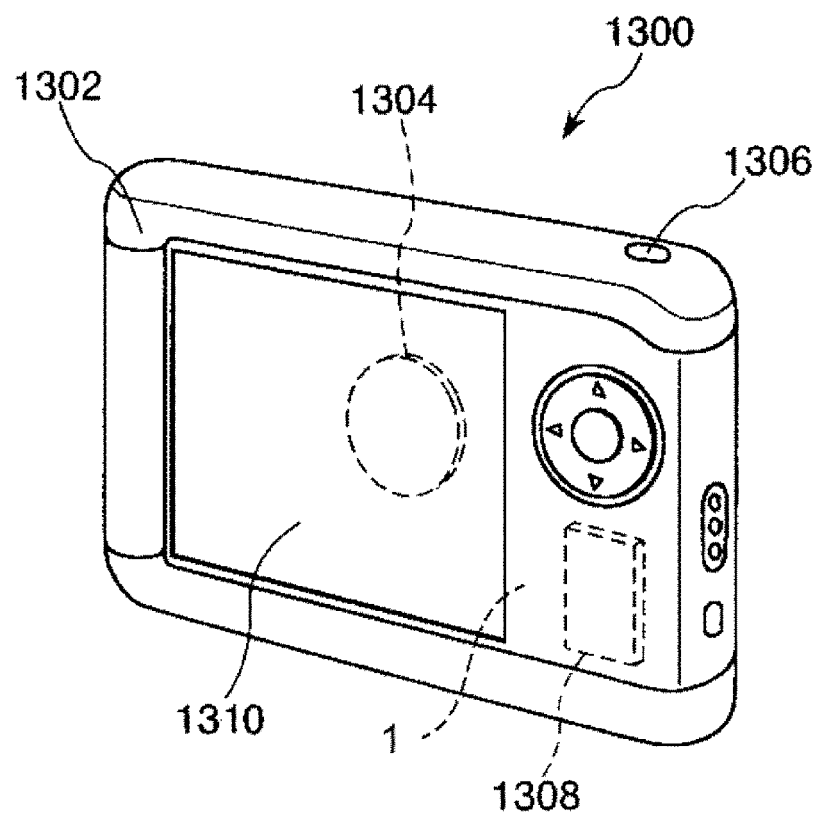
FIG. 14 is a perspective view illustrating an electronic apparatus in a sixth embodiment.

FIG. 14 is a perspective view illustrating an electronic apparatus in a sixth embodiment.

A digital still camera 1300 illustrated in FIG. 14 is an application of an electronic apparatus including the vibration device in the embodiments described above. A displayer 1310 is provided on a rear surface of a body 1302, and is configured to perform display based on an imaging signal from a CCD. The displayer 1310 functions as a finder that displays an object as an electronic image. In addition, alight receiving unit 1304 including an optical lens and the CCD is provided on the front side (the back side in the drawing) of the body 1302. When a photographer confirms a subject image displayed on the displayer 1310 and presses a shutter button 1306, an imaging signal at that time from the CCD is transferred and stored in the memory 1308. The vibration device 1 used as an oscillator, for example is incorporated in such a digital still camera 1300.

In addition, the digital still camera 1300 includes an arithmetic processing circuit that performs arithmetic processing relating to controlling a displayer 1310 and the light receiving unit 1304. The arithmetic processing circuit operates based on an oscillation signal output from the oscillator circuit of the vibration device 1.

As described above, the digital still camera 1300 as the electronic apparatus includes the vibration device 1 and the arithmetic processing circuit that operates based on the oscillation signal output from the oscillator circuit of the vibration device 1. Therefore, it is possible to exhibit a high reliability while enjoying the effects of the vibration device 1 described above.

In addition to the personal computer, the mobile phone, and the digital still camera described above, the present disclosure can be applied to the electronic apparatuses such as: smartphones, tablet terminals, watches (including smart watches), inkjet discharge devices (for example, inkjet printers), laptop personal computers, television systems, wearable terminals such as head mounted displays (HMDs), video cameras, videotape recorders, car navigation devices, pagers, electronic notebooks (including communication functions), electronic dictionaries, electronic calculators, electronic game devices, word processors, workstations, videophones, crime prevention TV monitors, electronic binoculars, POS terminals, medical devices (for example, electronic thermometers, blood pressure monitor, blood glucose meter, electrocardiogram measuring device, ultrasonic diagnostic device, electronic endoscope), fish detector, various measuring equipment, mobile terminal base station equipment, instrumentation (for example, instrumentations for an automobile, an aircraft, a ship), flight simulation recorder, a network server, and the like.

Seventh Embodiment

Figure 15:
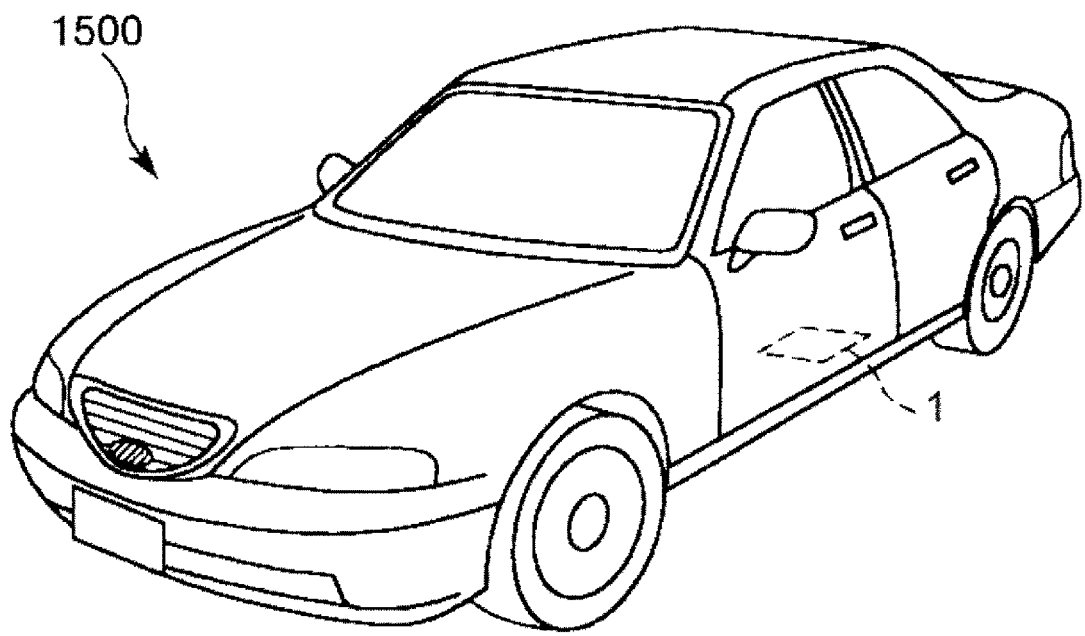
FIG. 15 is a perspective view illustrating a vehicle in a seventh embodiment.

FIG. 15 is a perspective view illustrating a vehicle in a seventh embodiment.

An automobile 1500 illustrated in FIG. 15 is an automobile to which a vehicle including the vibration device in the embodiments described above is applied. The vibration device 1 used as an oscillator and an arithmetic processing circuit that operates based on an oscillation signal output from an oscillator circuit of the vibration device 1 are incorporated in the automobile 1500. The vibration device 1 and the arithmetic processing circuit described above can be widely applied to, for example, a keyless entry, an immobilizer, a car navigation system, a car air conditioner, an anti-lock brake system (ABS), an airbag, a tire pressure monitoring system (TPMS), an engine control, a battery monitor for a hybrid automobile and an electric automobile, an electronic control unit (ECU) such as a body posture control system.

As described above, the automobile 1500 as the vehicle includes the vibration device 1 and the arithmetic processing circuit that operates based on the oscillation signal output from the oscillator circuit of the vibration device 1. Therefore, it is possible to exhibit a high reliability while enjoying the effects of the vibration device 1 described above.

The vehicle is not limited to the automobile 1500, and also can be applied to an airplane, a ship, an AGV (automated guided vehicle), a biped robot, an unmanned airplane such as a drone, and the like.

As described above, the vibration device, the electronic apparatuses, and the vehicles have been described based on the illustrated embodiment, however, the present disclosure is not limited thereto, and the configuration of each part can be replaced with any configuration having the same function. In addition, any other components may be added to the present disclosure. Furthermore, the present disclosure may be a combination of any two or more configurations in the embodiments described above.

What is claimed is:

1. A vibration device comprising:
    a base substrate which is a semiconductor substrate having first conductivity type;
    a lid substrate;
    a vibration element disposed between the base substrate and the lid substrate;
    a wiring disposed on a surface of the base substrate at the lid substrate side; and
    a coupling member that electrically couples the wiring and the vibration element to each other, wherein
    the base substrate includes
        a well having second conductivity type which is different from the first conductivity type, and
        a first contact area that is disposed in the well and has a first contact surface which is a part of the surface, the first contact area having the first conductivity type, and
    the wiring and the coupling member are in contact with the first contact surface, and are electrically coupled to each other via the first contact area.

2. The vibration device according to claim 1, further comprising:
    an intermediate substrate that is disposed between the base substrate and the lid substrate, and includes the vibration element, a frame surrounding the vibration element, and a coupler linking the vibration element and the frame;
    a conductive first joining member that is located between the frame and the base substrate, and joins the frame and the base substrate; and
    a conductive second joining member that is located between the frame and the lid substrate, and joins the frame and the lid substrate.

3. The vibration device according to claim 2, wherein the lid substrate is a semiconductor substrate having the first conductivity type, and
    the base substrate and the lid substrate are electrically coupled to each other via the first joining member and the second joining member.

4. The vibration device according to claim 3, wherein the base substrate includes
    a second contact area having the first conductivity type and in which first conductivity type impurities are doped at a high concentration relative to surroundings, and which includes a second contact surface that is a part of the surface, and
    the first joining member is in contact with the second contact surface.

5. The vibration device according to claim 3, wherein the lid substrate includes
    a third contact area having first conductivity type and in which first conductivity type impurities are doped at a high concentration relative to surroundings, and which includes a third contact surface that is a part of the surface, and
    the second joining member is in contact with the third contact surface.

6. The vibration device according to claim 2, wherein a coupling surface of the base substrate that is coupled to the coupling member and a coupling surface of the base substrate that is coupled to the first joining member are flush with each other, and
    a coupling surface of the intermediate substrate that is coupled to the coupling member and a coupling surface of the intermediate substrate that is coupled to the first joining member are flush with each other.

7. The vibration device according to claim 1, wherein the lid substrate includes a recess that opens to a surface at the base substrate side and that accommodates the vibration element, and is directly joined to the base substrate.

8. The vibration device according to claim 1, further comprising:
    an oscillator circuit formed on the base substrate and including the wiring.

9. An electronic apparatus comprising:
    the vibration device including
        a base substrate which is a semiconductor substrate having first conductivity type;
        a lid substrate;
        a vibration element disposed between the base substrate and the lid substrate;
        an oscillator circuit formed on the base substrate and including a wiring disposed on a surface of the base substrate at the lid substrate side; and
        a coupling member that electrically couples the wiring and the vibration element to each other, wherein
        the base substrate includes
            a well having second conductivity type which is different from the first conductivity type, and
            a first contact area that is disposed in the well and has a first contact surface which is a part of the surface, the first contact area having the first conductivity type, and
        the wiring and the coupling member are in contact with the first contact surface, and are electrically coupled to each other via the first contact area; and
    a processing circuit that operates based on an oscillation signal output from the oscillator circuit of the vibration device.

10. A vehicle comprising:
    the vibration device a including
        a base substrate which is a semiconductor substrate having first conductivity type;
        a lid substrate;
        a vibration element disposed between the base substrate and the lid substrate;
        an oscillator circuit formed on the base substrate and including a wiring disposed on a surface of the base substrate at the lid substrate side; and
        a coupling member that electrically couples the wiring and the vibration element to each other, wherein
        the base substrate includes a well having second conductivity type which is different from the first conductivity type, and a first contact area that is disposed in the well and has a first contact surface which is a part of the surface, the first contact area having the first conductivity type, and the wiring and the coupling member are in contact with the first contact surface, and are electrically coupled to each other via the first contact area; and an processing circuit that operates based on an oscillation signal output from the oscillator circuit of the vibration device.

\* \* \* \* \*